Sept. 7, 1954  C. J. CROWLEY  2,688,488
INFLATED ATHLETIC BALL AND METHOD OF MAKING
Filed Sept. 9, 1949  3 Sheets-Sheet 1

Inventor
Cornelius J. Crowley
By Rockwell Bartholow
Attorneys

Sept. 7, 1954          C. J. CROWLEY          2,688,488
INFLATED ATHLETIC BALL AND METHOD OF MAKING
Filed Sept. 9, 1949                               3 Sheets-Sheet 2

Inventor
Cornelius J. Crowley
By Rockwell & Bartholow
Attorneys

Sept. 7, 1954  C. J. CROWLEY  2,688,488
INFLATED ATHLETIC BALL AND METHOD OF MAKING
Filed Sept. 9, 1949  3 Sheets-Sheet 3
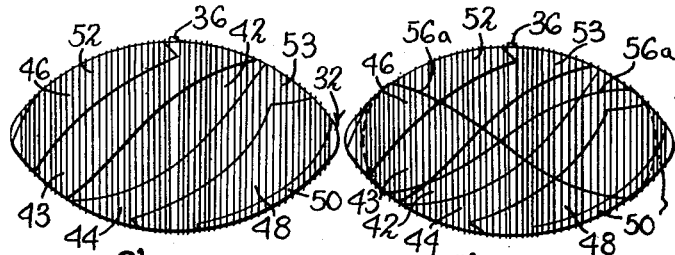
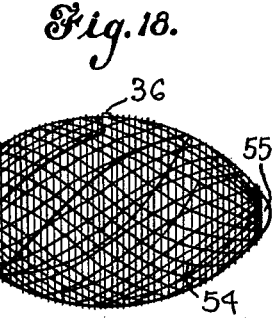
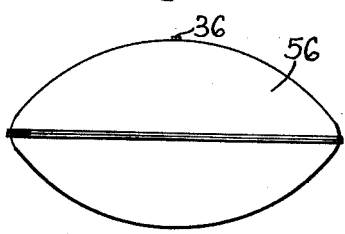
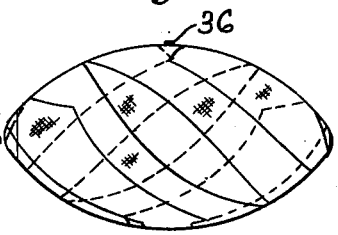
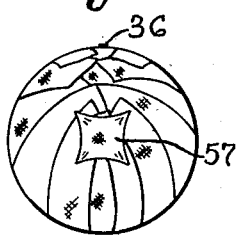
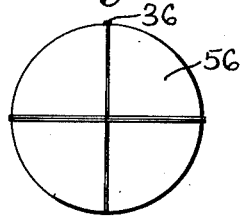
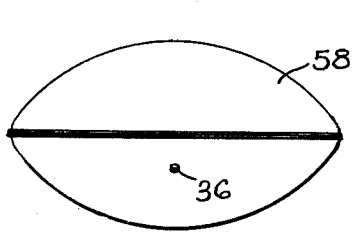
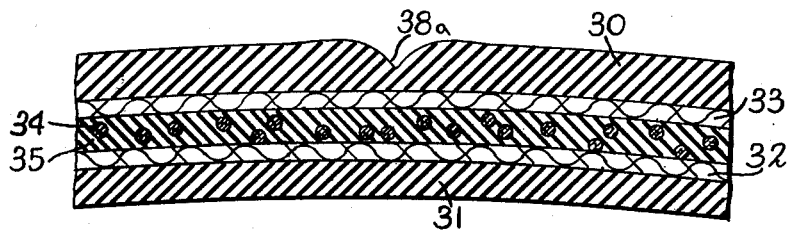
Inventor
Cornelius J. Crowley
By Rockwell & Bartholow
Attorneys Patented Sept. 7, 1954

2,688,488

UNITED STATES PATENT OFFICE 2,688,488

INFLATED ATHLETIC BALL AND METHOD OF MAKING

Cornelius J. Crowley, New Haven, Conn., assignor to The Seamless Rubber Company, New Haven, Conn., a corporation of Connecticut Application September 9, 1949, Serial No. 114,865

4 Claims. (Cl. 273—65)

This invention relates to athletic balls such as footballs, and, while not limited thereto, the invention has particular reference to an ellipsoidal football.

An object of the invention is to provide an improved ellipsoidal football which can be manufactured without the use of a form or last, and which is superior to previous articles of this kind.

Another object is to provide an improved ellipsodial football of the type in which a bladder, a laminated fibrous reinforcing wall, and an outer finishing layer or cover are all bonded together.

A further object is to provide an ellipsoidal ball in which the shape of the ball is retained notwithstanding hard service, and in which the growth of the ball during its service is effectively resisted.

A further object is to provide especially effective means for resisting the tendency of the ellipsodial ball to increase in girth along its major axis as a result of the internal pressure.

Another purpose of the invention is to provide an ellipsodial ball containing air under pressure, having an improved wall structure comprising fabric layers and one or more windings of thread or cord.

In the accompanying drawings:

Figs. 4 to 22 are somewhat diagrammatic views which show different steps in the process of making the ball, as hereinafter described; and Fig. 23 is an enlarged sectional transverse view of the ball wall.

The ball selected for illustration is an ellipsoidal football, in which a valve-equipped rubber bladder, a laminated fibrous reinforcing wall, including rubberized fabric and turns of thread, and an outer cover of rubber, or of a composition somewhat similar to rubber, are all bonded together. The term "rubber" is employed in a broad and general sense so as to apply to substances other than natural rubber. For purposes of description, the cover may be said to be a rubber cover. The reinforcing wall surrounding the bladder is composed in this case of inner and outer layers of rubberized fabric in the form of tapes or strips, with an interposed or intermediate layer comprising a number of turns of thread or cord embedded in an intermediate layer of rubber. The manner of applying the layers of tapes and the winding of thread will be hereinafter described.

Figure 1:
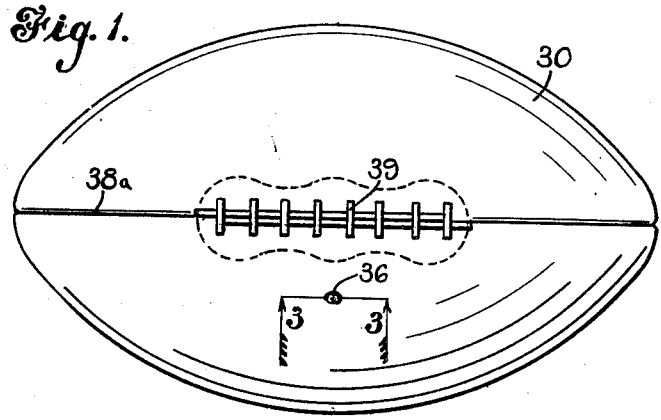
Fig. 1 is an elevation of a football constructed in accordance with the invention.
Figure 2:
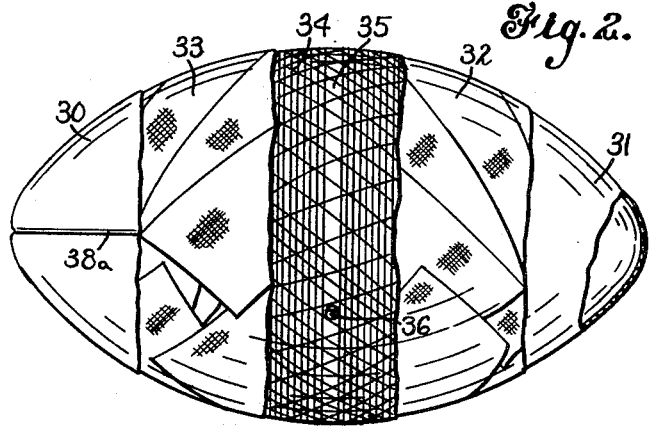
Fig. 2 is a broken view of the ball, showing portions of the different layers.
Figure 3:
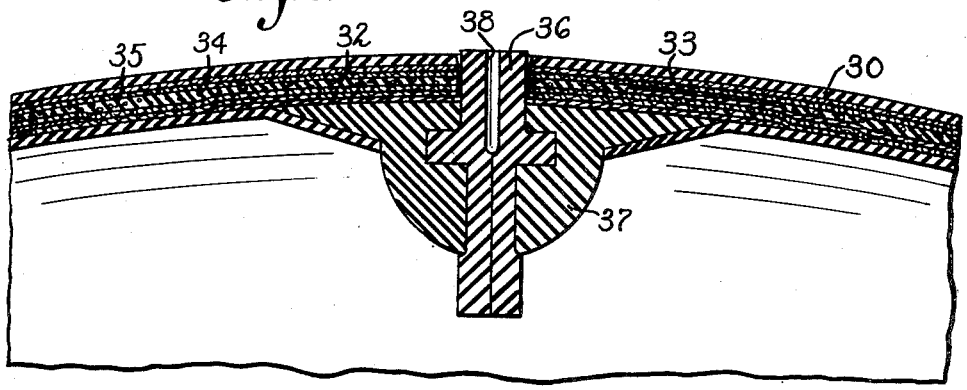
Fig. 3 is an enlarged section on line 3—3 of Fig. 1.
Figure 4:
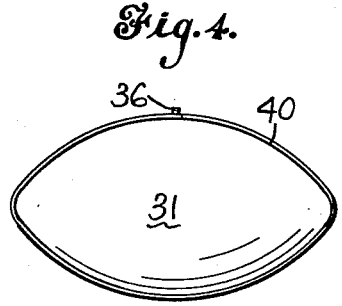

In general views (Figs. 1 to 3, inclusive, and Fig. 23), the rubber cover of the ball is shown at 30, the rubber bladder at 31, the innermost fabric layer at 32, the outermost fabric layer at 33, the interposed thread turns at 34, and the rubber layer in which the thread turns are embedded at 35. The valve with which the bladder is equipped is shown at 36, said valve being provided with a body 37 attached to the bladder wall and being extended through an aperture in the superposed layers of the wall, and being provided at its mouth portion with a socket 38 for an inflating needle. This valve is preferably of the kind disclosed in the De Laney and Madsen Patent No. 2,065,121, dated December 22, 1936. The rubber covering layer 30 may have molded in its external surface four grooves such as shown, for example, at 38ª, these grooves being longitudinally disposed and being provided for increasing the effectiveness of the grip upon the ball. As an additional means for increasing the effectiveness of the grip upon the ball, the wall may be equipped with a threaded-in thong or lacing, indicated at 39. Such thong or lacing may be arranged in the manner described in the Gow and Crowley application, Serial No. 705,938, filed October 26, 1946, now Patent No. 2,575,414.

The structure of the reinforcing fibrous part of the wall can probably be best understood from the following description of the method of constructing the ball.

Figure 5:
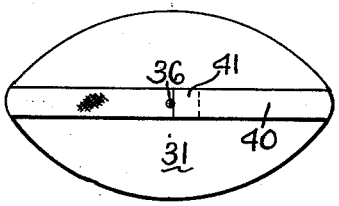

An ellipsoidal bladder, equipped with a valve such as previously mentioned, is inflated to such an extent that it is filled with air and given a shape approximating the final ball shape, and is made sufficiently firm to support the fabric layer 32, which is a layer of rubberized strips having gummed surfaces that are adapted to be placed upon the external surface of the bladder. The bladder, as provided, is vulcanized, or in any case partially vulcanized. The valve has its rubber stem projecting to some extent beyond the outer surface of the bladder, and is preferably arranged midway of the ball length. The first step is to apply to the bladder an encircling tape or strip 40, this being in this particular case a relatively narrow strip having a width of about one inch. Near one end of the strip is a perforation, and this end portion of the strip is placed over the valve and the other end of the strip overlapped upon the first end, as indicated at 41 in Fig. 5. The strip thus laid upon the bladder confines or encircles it in a lengthwise direction and reinforces it. The strip is impregnated with uncured rubber, and the strip is cut on the bias in order to reduce its stretch to a minimum. This strip is disposed generally in a plane coinciding with the major axis of the bladder and crosses the rather pointed pole portions at the respective ends of the bladder, as shown in the drawings.

Figure 6:
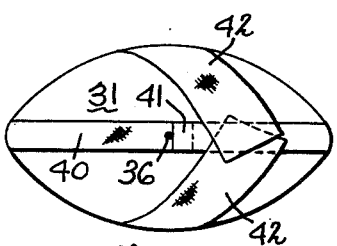
Figure 7:
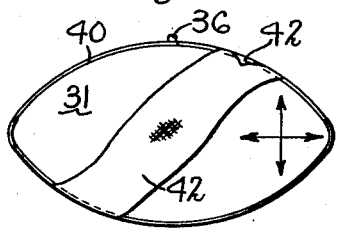

After the application of the strip 40, the next step is to apply the two strips 42, shown in Figs. 6 and 7. The strips 42 may be of the same kind of material as the strip 40, but in the case shown they are somewhat wider, having a width of, say, two inches. As before, these strips are cut on the bias, and as a result their component threads will extend in the direction of the arrows placed upon Fig. 7, one arrow being in line with the major axis of the bladder and the other being at right angles thereto. The threads running at right angles to the bladder axis are effective in resisting increase of girth of the bladder along its length. The two strips 42 are located, respectively, at opposite sides of the longitudinal strip 40, each being secured at one end to a portion of this longitudinal strip at one side of the ball and being secured at the other end to a portion of the longitudinal strip at the opposite side of the ball. In practice, the respective ends of a strip 42 may be adhesively secured to respective portions of the strip or tape 40, and then the ends of the other strip 42 may be adhesively secured to the ends of the first strip 42, as shown, for example, in Fig. 6. As shown in Fig. 7, each of the strips 42 is placed upon the bladder surface obliquely, or on a slant, so that approximately one half of the strip is located on one end portion and the other half on the other end portion.

Figure 8:
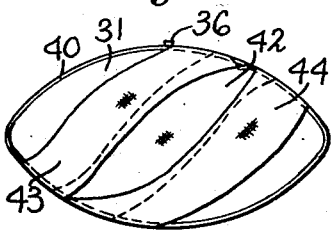
Figure 9:
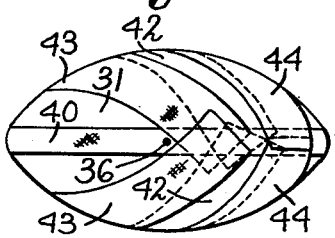

The next views, viz., Figs. 8 and 9, show the addition of two strips 43 and 44 at each side of the bladder, said strips or tapes being slightly overlapped upon the strip 42 and secured thereto in a manner indicated in Fig. 8, and also being obliquely disposed and employed for extending the encasement of the bladder toward the respective ends. These strips are adhered and conformed to the bladder surface and to portions of the strip 42, and each strip 43 or 44 has its ends in overlapping relation to the corresponding strip at the other side, and is laid at its ends across the narrow strip 40 in the manner which will be evident from Fig. 9.

Figure 10:
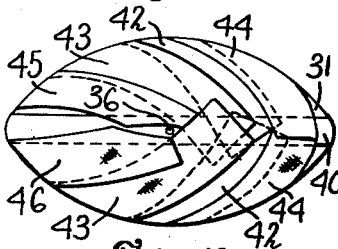
Figure 11:
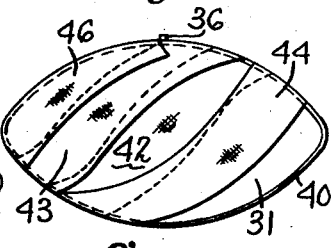

The next step is shown in Figs. 10 and 11, and this consists in covering over the bladder area remaining uncovered at the left-hand end (Fig. 9), this being done by the application of further tapes or strips, indicated at 45 and 46, one of these strips being located at one side of the tape 40 and the other being located at the opposite side, and both being lapped upon the tape 40 at diagonally opposite portions of said tape. In this particular case the vacant space at one side of the bladder is somewhat wider than that at the opposite side, and for this reason strip 46 is somewhat wider than strip 45.

Figure 12:
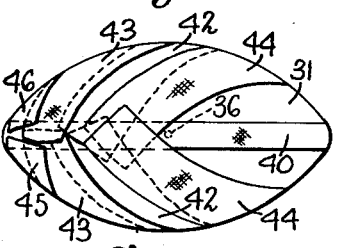
Figure 13:
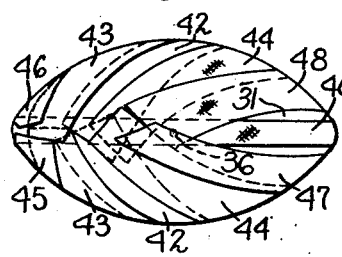
Figure 14:
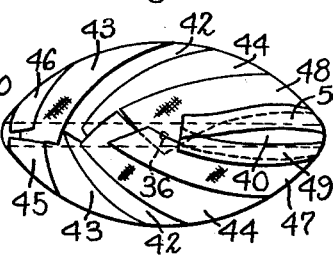
Figure 15:
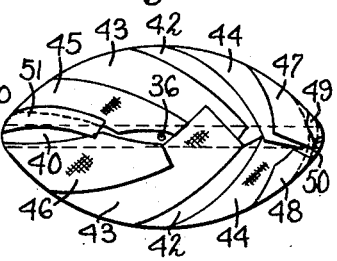

The next step is to fill in the spaces at the right-hand ends of Figs. 11 and 12 which remain uncovered, and this is done by the application of strips 47 and 48, as shown in Fig. 13. This leaves uncovered certain spaces at the right of Fig. 13, and these are covered by the application of narrow strips 49 and 50, and then finally the vacant space remaining at the left of Fig. 10 is covered in by the application of the narrow strip 51, as shown in Fig. 15.

Now with regard to all of the above-described views following Fig. 7, it is to be observed that, in looking from the side of the ball, as in Fig. 8, for example, the obliqueness of the strips applied at the respective sides of the longitudinal median plane is such that in these strips the angle of the strip to the vertical is roughly or approximately 45°, so that the bias-cut strips will all resist increase in girth of the bladder, as above described in connection with the strips 42. It is also to be observed that, when the strips 43 are applied (Fig. 8), their forward ends will be immediately forwardly of the valve, while, when the strips 45 and 46 are applied, their forward extremities (Fig. 10) will leave a clear space between them for the valve, although obviously other arrangements can be adopted if desired for leaving a clear space at the valve location.

The next step is the application of the thread winding, and this is shown in Figs. 16 to 18, inclusive. First, the fabric-covered bladder is wound with thread turns which are practically parallel to each other, and which are fairly well spaced apart, from regions quite near the poles practically to the center of the ball, as shown in Fig. 16. In Fig. 16 this rather loose and well-spaced thread winding is shown, and in this particular case there is a wound portion 52 covering approximately half of the ball length and another portion 53 covering approximately the other half. Following the application of the thread turns in the manner just described, the next step is the application of another layer of thread turns, indicated at 54 in Fig. 18, these turns being fairly loose and fairly well spaced from each other, and being arranged in a crisscross figure-eight fashion so as to provide loose windings covering the ball except for small pole portions or parts which are indicated at 55. In proceeding to form the thread layer 54, the thread is carried about the ball in the manner indicated at 56ᵃ in Fig. 17 to provide two figure-eight parts that are looped about the ball ends and intersect each other approximately at the middle of the ball, and the formation of loops of this nature at different regions of the cross section of the article is continued until the first winding 52, 53 is fully covered over in the manner shown in Fig. 18. In connection with the first winding 52, 53 and the second winding 54, it is to be observed that the first disposes thread turns substantially at right angles to the longitudinal axis so as to be in a position to resist increase in girth lengthwise of the ball, whereas the covering of figure-eight turns (54) is placed so that it will inhibit growth of the ball in an endwise direction.

The next step is to cover the wound article with a layer of uncured rubber, and this is shown in Fig. 19, where the uncured rubber layer is indicated at 56. This layer is made up of pieces arranged in any suitable manner to provide a cover over the article. In the case shown, the covering is made up of four separate pieces of rubber sheeting, which extend the full length of the ball and have their adjacent edges overlapped, as shown in Fig. 19ᴬ.

The next step is the application to the uncured rubber covering of the second fabric layer. The latter layer is preferably formed in the same manner as the first fabric layer, and therefore the description in this respect is not repeated. Nevertheless, it is important to note that there is a definite relationship between the tapes of the second layer with respect to those of the first, inasmuch as the obliqueness of the second group of tapes is opposite to that of the first, as indicated in Fig. 20, where the underlying fabric tapes, i. e., those of the first layer, are indicated by dotted lines. The second fabric layer may have a longitudinal encircling tape corresponding to tape 40 applied in the general plane of the valve, as previously described, and if such a tape is used the arrangement of the other tapes of the second layer is exactly as previously described, except for the fact that the tapes of the second layer cross those of the first in the manner indicated in Fig. 20. This increases the strength of the ball, and there is also a more even distribution of the weight in the ball wall. In some cases it may be advisable to omit the tape corresponding to tape 40 in the second fabric layer.

In the manufacturing process shown in the drawings, small fabric pole pieces 57 are applied to the second fabric layer, as indicated in Fig. 21, for the purpose of reinforcing the tip portions of the carcass, but in some cases these pieces 57 can be omitted.

The next step is to apply to the article the vulcanizable rubber or rubber composition of which the cover 30 is made. This covering of uncured material is indicated at 58 in Fig. 22, and this uncured material may be applied in pieces substantially in the same manner as the intermediate rubber layer 56.

After application of the outer covering material, the article is placed in a suitable mold having an interior surface corresponding in size and shape to the finished ball. The article is inflated so as to create the necessary molding pressure, air being introduced into the interior of the article by way of the rubber valve. The mold is a heated mold, and while the article is being shaped by pressing its composite wall against the surface of the mold cavity, vulcanization is effected, although there is no limitation to this particular vulcanization procedure. The result of the air pressure is to cause a considerable thinning and densification of the ball wall. As this proceeds, the thread turns, which were initially arranged under or within the intermediate layer of rubber, are driven outwardly into this rubber so as to become embedded therein, as shown in Fig. 23. The fabric tapes are filled or impregnated with uncured rubber, and in the final article the several layers shown in Fig. 23 are very effectively bonded together and vulcanized so as to produce a very strong, tough and durable ball wall. The intermediate rubber layer lies against the inner and outer fabric layers so as to give resilient support therefor, and acts as a cushioning or compensating element which tends to take up and compensate for inequalities and unevenness of the two fabric layers.

In the present case the ball is described as having a finishing layer of rubber, but if desired the finishing layer may consist of pieces of leather or imitiation leather.

Before winding on the thread, as previously described, the thread may be impregnated with uncured rubber. The layer of thread is preferably quite open, as herein described, in order to increase the bonding effect, and especially the bonding together of the two layers of tapes.

The herein described procedure and the herein described arrangement of the tapes and thread turns have manifest advantages, both from the point of view of the finished product and from the point of view of the manufacturing process. The wall maintains its shape and resists growth or expansion in a manner which is distinctly superior to that of previously made ellipsoidal balls. There is much better resistance to growth laterally and lengthwise with respect to the major axis. The ball wall also has maximum toughness and durability.

Various changes in the details of the ball and method may be made without departure from the principles of the invention or the scope of the claims.

I do not claim broadly herein an athletic ball having a composite wall structure including an inner valve-equipped inflatable valve element and an outer cover element, a fabric layer in a number of pieces located between said elements and in contiguous relationship to one of them, said wall structure also including an intermediate layer contiguous to and supporting said fabric layer at the side opposite the said one element, said intermediate layer comprising a body of rubber, and a winding of thread embedded in the rubber body, or other features claimed in my application Serial No. 724,003, filed January 24, 1947, now Patent No. 2,623,747.

What I claim is:

1. An ellipsoidal athletic ball comprising a valve equipped ellipsoidal bladder, a cover, and a fibrous structure intermediate the bladder and the cover including a reinforcing tape in the form of a loop having its ends interconnected and lying in line with the major axis of the ball and also including a separate set of fabric strips applied to the bladder surface at each side of the reinforcing tape and disposed obliquely to said reinforcing tape, said strips at each side of the reinforcing tape being in progressively overlapping relation to cover the surface of the bladder and with the ends of each set of strips having lapping relationship with the ends of the other set of strips at points along the length of said reinforcing tape, all of the strips in each set having one end connected to the reinforcing tape at one point in the length of the ball and the other end connected to said reinforcing tape at another point in the length of said ball, and with the obliqueness of one set of fabric strips with respect to said reinforcing tape being opposite to that of the other set.

2. An ellipsoidal athletic ball comprising a valve equipped ellipsoidal bladder, a cover, and a fibrous structure intermediate the bladder and the cover, including an inner layer comprising a reinforcing tape in the form of a loop having its ends interconnected and lying in line with the major axis of the ball together with a separate set of fabric strips at each side of the reinforcing tape disposed obliquely to said reinforcing tape and with the obliqueness of one set of fabric strips with respect to said reinforcing tape being opposite to that of the other set, and also including a similar outer layer with two sets of fabric strips similarly disposed obliquely to a reinforcing tape lying in line with the major axis of the ball, all of the fabric strips in both layers being in progressively overlapping relation to cover the surface of the bladder, and the obliqueness of fabric strips of the outer layer being opposite to that of the fabric strips in the inner layer.

3. The method of making an inflatable athletic ball which comprises providing a valve-equipped bladder, inflating said bladder, applying to the bladder a reinforcing tape having its ends interconnected and disposed loopwise about the bladder in a plane passing through the major axis of the ball and then applying a separate set of fabric strips to the bladder at each side of said reinforcing tape obliquely disposed with reference thereto and with the ends of said fabric strips in lapping relationship with different portions of said reinforcing tape, said strips at each side of the reinforcing tape thus applied being in progressively overlapping relation to cover the surface of the bladder and with the ends of each set of strips having lapping relationship with the ends of the other set of strips at points along the length of said reinforcing tape.

4. The method of making an athletic ball which comprises providing a valve-equipped bladder, inflating said bladder, applying to the bladder a reinforcing tape having its ends interconnected and disposed loopwise about the bladder in a plane passing through the major axis of the ball, then applying a separate set of fabric strips to the bladder at each side of said reinforcing tape obliquely disposed with reference thereto and with the strips at each side of the reinforcing tape in progressively overlapping relation in providing a fabric layer to cover the surface of the bladder, applying a layer of thread turns to said fabric layer, and then applying a second fabric layer including two sets of fabric strips similarly disposed obliquely to a reinforcing tape lying in line with the major axis of the ball and with the oblique strips of said second fabric layer arranged in crossing relationship to the oblique strips of the first mentioned fabric layer.

References Cited in the file of this patent

UNITED STATES PATENTS

| Number | Name | Date |
|---|---|---|
| 1,171,238 | Pierce | Feb. 8, 1916 |
| 2,061,604 | Winterbauer | Nov. 24, 1936 |
| 2,194,132 | Voit et al. | Mar. 19, 1940 |
| 2,302,985 | Voit et al. | Nov. 24, 1942 |
| 2,367,374 | Reach | Jan. 16, 1945 |
| 2,380,370 | Smith | July 10, 1945 |
| 2,399,324 | Clark | Apr. 30, 1946 |
| 2,509,882 | Roberts | May 30, 1950 |

FOREIGN PATENTS

| Number | Country | Date |
|---|---|---|
| 230,554 | Great Britain | Mar. 16, 1925 |